(12) United States Patent
Schumacher et al.

(10) Patent No.: US 12,108,244 B1
(45) Date of Patent: Oct. 1, 2024

(54) SYSTEM AND METHOD FOR MASKING USER APPLICATION USAGE

(71) Applicant: T-Mobile Innovations LLC, Overland Park, KS (US)

(72) Inventors: Gregory Schumacher, Holliston, MA (US); Marouane Balmakhtar, Fairfax, VA (US); Serge Manning, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 379 days.

(21) Appl. No.: 17/545,232

(22) Filed: Dec. 8, 2021

(51) Int. Cl.
*H04W 12/03* (2021.01)
*H04W 12/02* (2009.01)
*H04W 12/30* (2021.01)

(52) U.S. Cl.
CPC ........... *H04W 12/02* (2013.01); *H04W 12/03* (2021.01); *H04W 12/35* (2021.01)

(58) Field of Classification Search
CPC .................................................. H04W 12/02
See application file for complete search history.

(56) References Cited

U.S. PATENT DOCUMENTS

| 10,560,510 | B2* | 2/2020 | Li ........................... H04L 67/63 |
| 10,652,942 | B2 | 5/2020 | Castellanos Zamora et al. |
| 2019/0138749 | A1* | 5/2019 | Kim ................... G06F 21/6254 |
| 2022/0038986 | A1* | 2/2022 | Soliman ............. H04W 40/246 |

FOREIGN PATENT DOCUMENTS

| WO | 2020/252281 A1 | 12/2020 |
| WO | 2021/035206 A1 | 2/2021 |

* cited by examiner

*Primary Examiner* — Michael T Vu
(74) *Attorney, Agent, or Firm* — Jones Robb, PLLC

(57) ABSTRACT

Systems, methods, and processing nodes for managing a wireless communication session perform and/or comprise: receiving a privacy enable request from an application associated with a wireless communication device; masking an application identifier corresponding to the application, thereby to generate a masked application identifier; receiving an application attribute request from a route selection manager, the application attribute request including a request for the application identifier; and in response to the privacy enable request and the application attribute request, returning an application attribute request response to the route selection manager, the application attribute request including the masked application identifier.

17 Claims, 8 Drawing Sheets

SYSTEM AND METHOD FOR MASKING USER APPLICATION USAGE

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Each individual network, and each individual RAT, typically supports a large number of end-users and a large number of different types of wireless devices. Different users and/or wireless devices may have different needs or priorities; for example, one user may require high bandwidth, whereas another user may require high reliability, enhanced security, and/or low latency. Moreover, a single wireless device may have different needs or priorities for different types of traffic (e.g., traffic corresponding to different user applications). To accommodate the different service needs NR provides extended data traffic classification by which a network may be divided into different sub-networks, (e.g., Data Network Names (DNNs) or network slices), each of which provides a different logical end-to-end connection and which may provide its own network parameters, rules, quality-of-service (QOS), quality-of-experience (QoE), and so on. Such network slices may be provided by the network itself and selected according to network management systems or operations included in the wireless device.

One example of network slicing used in NR applications is UE Route Selection Policy (URSP). URSP is managed at the wireless device side and/or by certain network entities, and may be implemented in the communication circuitry (e.g., the modem) and/or the operating system of the wireless device. For example, a wireless device compatible with URSP may determine the communication needs of a particular type of traffic (e.g., based on application settings, registry information, and so on) and initiate a protocol data unit (PDU) session on a corresponding network slice, such that the particular PDU session initiated corresponds to the communication needs of the traffic in question. The communication needs may be determined based on the particular device application generating the communication, which may be indicated by an application identifier (App ID). In such cases, the wireless device may retrieve the App ID and compare it with predetermined URSP rules. If there is a rule which matches the App ID, the device will establish a particular PDU session determined by the rule.

Overview

Various aspects of the present disclosure relate to systems and methods of masking user application information in a network, such as a telecommunications network including network slicing capabilities.

In one exemplary aspect of the present disclosure, a method of managing a wireless communication session comprises: receiving a privacy enable request from an application associated with a wireless communication device; masking an application identifier corresponding to the application, thereby to generate a masked application identifier; receiving an application attribute request from a route selection manager, the application attribute request including a request for the application identifier; and in response to the privacy enable request and the application attribute request, returning an application attribute request response to the route selection manager, the application attribute request including the masked application identifier.

In another exemplary aspect of the present disclosure, a telecommunications system comprises: an access node; and a wireless communication device configured to communicate with a network via the access node, the wireless communication device storing an application, an application registry, and a privacy manager, wherein the privacy manager is configured to: receive a privacy enable request corresponding to the application, and mask an application identifier corresponding to the application, thereby to generate a masked application identifier, wherein the wireless communication device is configured to: receive an application attribute request from a route selection manager, the application attribute request including a request for the application identifier, and in response to the privacy enable request and the application attribute request, return an application attribute request response to the route selection manager, the application attribute request including the masked application identifier.

In another exemplary aspect of the present disclosure, a wireless communication device comprises: a memory storing an application; wireless communication circuitry configured to communicate with an access node; and a processor configured to perform operations comprising: receiving a privacy enable request from an application associated with a wireless communication device, masking an application identifier corresponding to the application, thereby to generate a masked application identifier, receiving an application attribute request from a route selection manager, the application attribute request including a request for the application identifier, and in response to the privacy enable request and the application attribute request, returning an application attribute request response to the route selection manager, the application attribute request including the masked application identifier.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
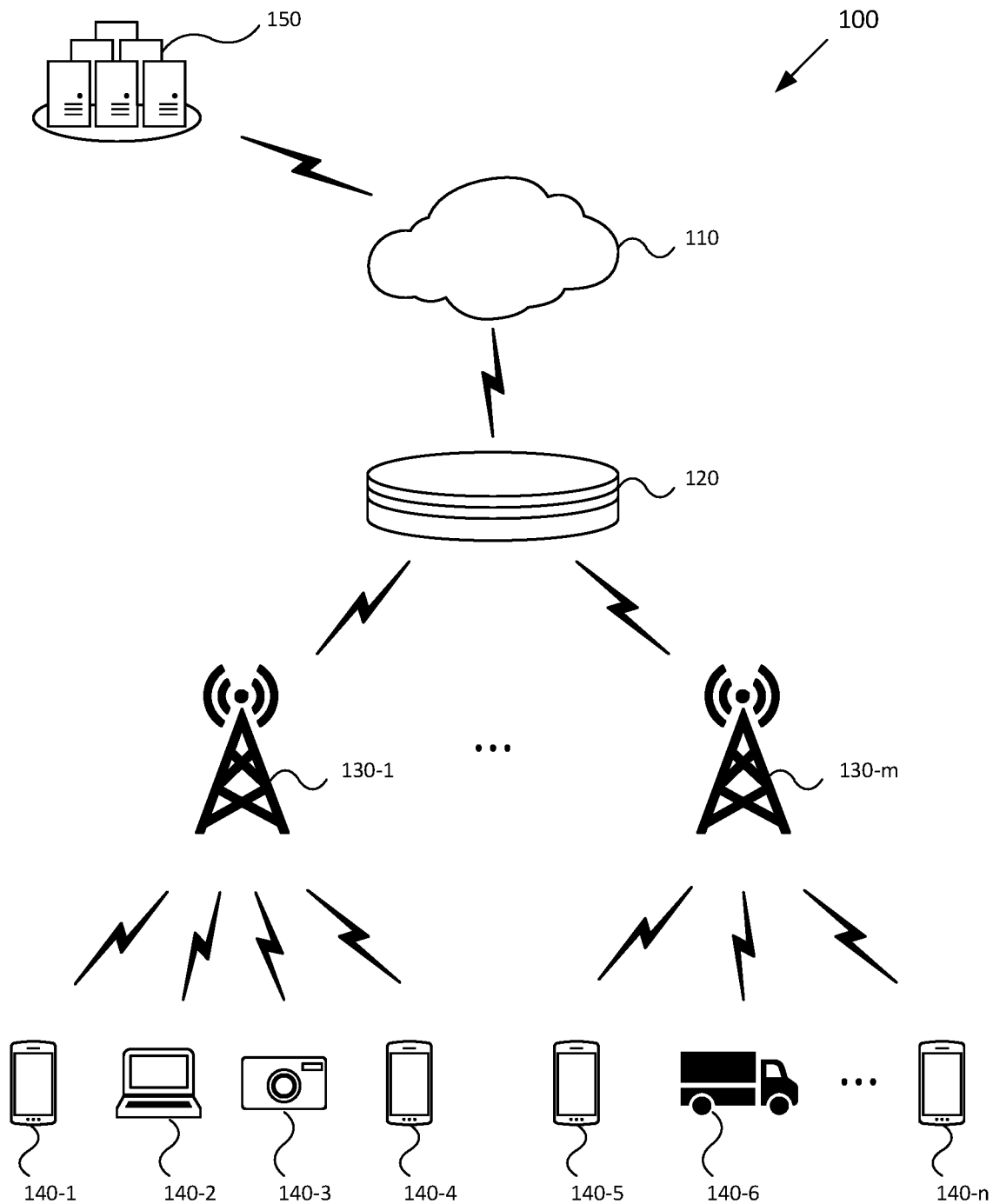
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

As noted above, URSP may be implemented to manage network traffic and communication needs or preferences on an application-by-application basis. Thus, traffic from an application may be routed to a particular network slice according to an App ID. Such routing may permit network operators and/or other third parties to isolate and monitor usage of particular applications. However, in certain circumstances it may be undesirable to permit certain parties to monitor network traffic and determine which traffic corresponds to which application. For example, a malicious actor may use URSP App-ID-triggered rules to send users' traffic from targeted applications (e.g., peer-to-peer messaging applications, banking or other financial application, etc.) for further interception and surveillance. In certain jurisdictions, for example, a government entity can coordinate with or coerce licensed network operators to use URSP App-ID-triggered rules to identify users of targeted applications, intercept the communications of these applications, identify the users' contacts if the application either uses unencrypted signaling or is using peer-to-peer communication, reveal the locations of users when using these applications, and/or reveal other private information.

Even if the communication of the application is end-to-end encrypted, some private information such as network metadata can still be revealed; moreover, through the use of signal intelligence (SIGINT) even encrypted information may in some cases be revealed. Therefore, there exists a need for systems, devices, and methods which allow the user to specify any application on the user's wireless device ("user equipment" or UE) to be exempted from URSP App-ID-triggered rules on an application-by-application basis (e.g., to set a certain application to private mode while allowing other applications to continue to follow the URSP rules). The present disclosure provides a privacy manager (also referred to as a Private Application Function, PAF, or PrivateAppF) to safeguard users' application usage privacy.

In accordance with aspects of the present disclosure, a privacy manager may provide one or more types of mitigation. In one exemplary type, the privacy manager may create a privacy function between the URSP and the OS (or another location where App IDs are provided or maintained) in the UE. This privacy function can mask the App ID, either by removing it or marking it as private. Because the App ID is masked, the URSP would not match it to any App-ID-triggered rules and may instead treat application traffic as generic traffic. In another exemplary type, if App IDs are removed or masked and therefore unavailable to the URSP, the present disclosure may instead mask the App ID by replacing it with the App ID of another randomly-selected application that is not marked private and not covered by a URSP App-ID-triggered rule (whether the application is installed on the UE or not). This may prevent the usage of a rule by the malicious actor in which the presence of a removed or marked-private App ID triggers interception and/or surveillance. A privacy manner in accordance with the present disclosure may operate on an application-by-application basis or on a global (all application) basis.

For purposes of illustration and explanation, various portions of this detailed description refer to implementations in a network using a 5G RAT; however, the present disclosure is not so limited. The systems and methods described herein may be implemented in any RAT or combinations of RATs in which a type of network slicing is implemented, including but not limited to 3G RATs such as GSM, UMTS, CDMA, etc.; 4G RATs such as WiMAX, LTE, etc.; 5G RATs such as NR; and further extensions or updated implementations of the same.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an 5G NR gNodeB.

FIG. 1 illustrates an exemplary system 100 for use with various aspects of the present disclosure. As illustrated, the system 100 includes a cloud platform 110, a core network 120, and a plurality of access nodes 130-1 to 130-m (collectively referred to as access nodes 130), and a plurality of wireless devices 140-1 to 140-n (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an NR cloud platform, may perform processing and forward results to the computing systems and devices 150 and/or the wireless devices 140. The core network 120, which may be an 5G Core Network (5GCN), connects with the cloud platform 110 and the access nodes 130. Examples of the core network and/or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IOT) devices such as smart-home sensors, and the like. Examples of the wireless devices 140 will be described in more detail below with respect to FIGS. 2 and 4.

Figure 2:
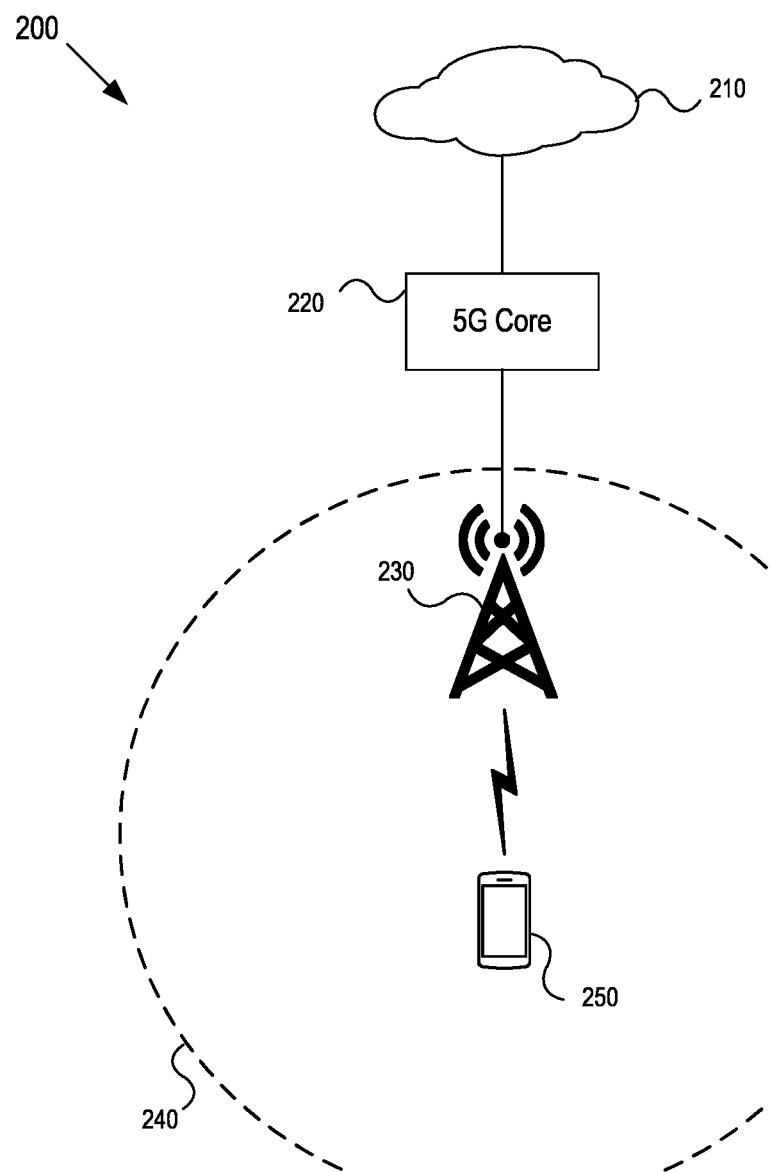
FIG. 2 illustrates an exemplary configuration of a system for wireless communication in accordance with various aspects of the present disclosure

FIG. 2 illustrates a configuration in which a system 200 provides coverage via an access node within a particular area. For purposes of illustration and explanation, the system 200 is illustrated as an 5G System (5GS); however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

As illustrated, the system 200 comprises a communication network 210, a 5G core 220, an access node 230 which provides service in a coverage area 240, and a wireless device 250. For purposes of illustration and ease of explanation, only one access node and one wireless device are shown in the system 200; however, as noted above with regard to FIG. 1, additional access nodes and/or additional or fewer wireless devices may be present in the system 200. In the illustration of FIG. 2, the access node 230 is connected to the communication network 210 via an NR path (including the 5G core 220); however, in practical implementations the access node 230 may be connected to the communication network 210 via multiple paths (e.g., using multiple RATs). The access node 230 communicates with the 5G core 220 via one or more communication links, each of which may be a direct link (e.g., an N2 link, an N3 link or the like). The access node 230 may also communicate with additional access nodes via a direct link.

A scheduling entity may be located within the access node 230 and/or the 5G core 220, and may be configured to accept and deny connection requests and manage communication sessions (e.g., PDU sessions) and/or network slices, as will be described in more detail below. The access node 230 may be any network node configured to provide communications between the connected wireless devices and the communication network 210, including standard access nodes and/or short range, lower power, small access nodes. As examples of a standard access node, the access node 230 may be a macrocell access node, a base transceiver station, a radio base station, a gNodeB in 5G networks, an eNodeB in 4G/LTE networks, or the like, including combinations thereof. In one particular example, the access node 230 may be a macrocell access node in which a range of the coverage area 240 is from approximately five to thirty-five kilometers (km) and in which the output power is in the tens of watts (W). As examples of a small access node, the access node 230 may be a microcell access node, a picocell access node, a femtocell access node, or the like, including a home gNodeB or a home eNodeB.

The access node 230 can comprise one or more processors and associated circuitry to execute or direct the execution of computer-readable instructions such as those described herein. In so doing, the access node 230 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 230 can receive instructions and other input at a user interface.

Figure 3:
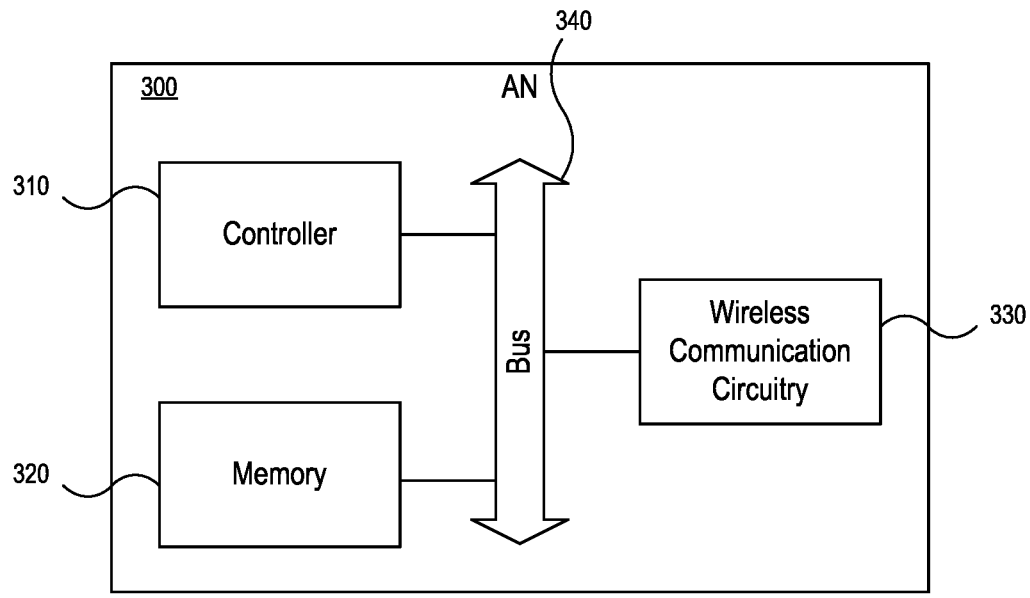
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 230 shown in FIG. 2. As illustrated the access node 300 includes a controller 310, a memory 320, wireless communication circuitry 330, and a bus 340 through which the various elements of the access node 300 communicate with one another. The controller 310 may include sub-modules or units, each of which may be implemented via dedicated hardware (e.g., circuitry), software modules which are loaded from the memory 320 and processed by the controller 310, firmware, and the like, or combinations thereof. Some or all of the sub-modules or units may physically reside within the controller 310, or may instead reside within the memory 320 and/or may be provided as separate units within the access node 300.

The wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive connection requests via the wireless communication circuitry 330 and output connection determinations and/or acknowledgements via the wireless communication circuitry 330, thereby allowing or denying the connection requests. The access node 300 may include additional wireless communication circuitry elements, for example to communicate using additional frequencies and/or to provide connectivity for different RATs. The access node 300 may further include additional wired communication circuitry elements.

Figure 4:
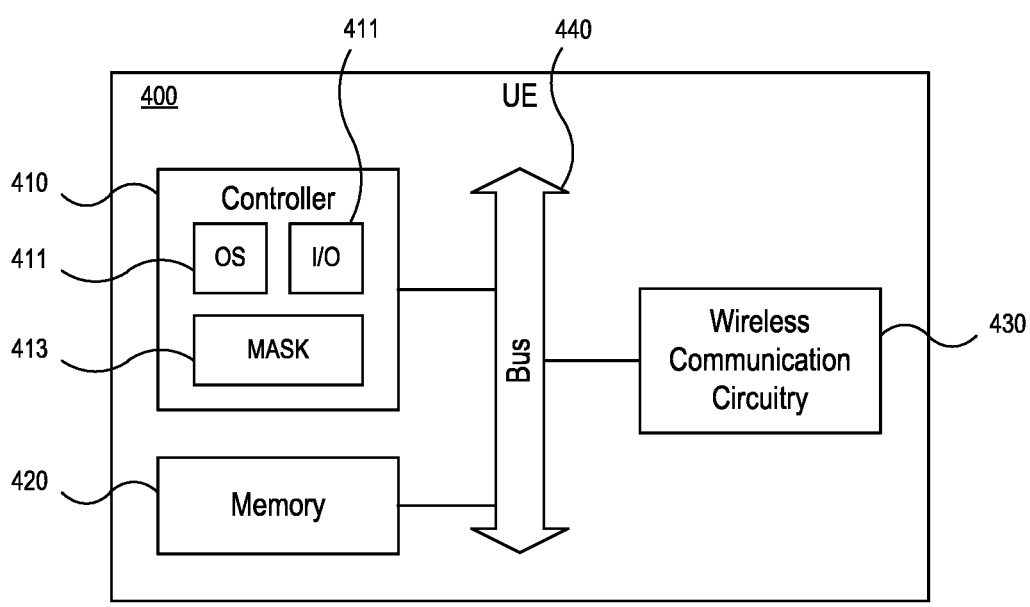
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or the wireless device 250 shown in FIG. 2. As illustrated, the wireless device 400 includes a controller 410, a memory 420, a wireless communication circuitry 430, and a bus 440 through which the various elements of the wireless device 400 communicate with one another. The controller 410 includes various sub-modules or units to implement operations and processes in accordance with the present disclosure. These sub-modules or units include an operating system (OS) 411 (e.g., operating circuitry or an operation program), an input/output (I/O) module 412 (e.g., I/O circuitry or an I/O program) configured to receive and respond to requests, and a masking unit 413 (e.g., masking circuitry or a masking program) configured to perform various application privacy operations as will be described in more detail below.

The OS 411 may provide a platform for operating the wireless device 400, including but not limited to managing the receipt of input via a user interface (UI); generating and/or displaying of one or more graphical UIs (GUIs) to the user, for example on a display device included in the wireless device 400; loading, managing, and operating one or more applications installed on the wireless device 400 (e.g., stored in the memory 420); providing a PAF as an interface between the one or more applications and other components of the OS 411; store and/or manage a device registry, which may include an application registry storing details and information relating to the one or more applications; and so on.

The I/O module 412 may be configured to receive and respond to requests from a user of the wireless device 400, from other components of the wireless device 400, and/or from other network elements with which the wireless device 400 communicates (e.g., via the wireless communication circuitry 430). For example, the I/O module 412 may be configured to receive a privacy enable request from an application associated with the wireless device 400; to receive an application attribute request from a route selection manager (e.g., a URSP management element located in the wireless device 400, the application attribute request including a request for an App ID of an application installed on the wireless device 400; and/or to respond by returning an application attribute request responds to the route selection manager with the App ID or with the masked App ID, depending on a privacy setting for the application. In some implementations, the I/O module 412 itself may include the route selection manager.

In implementations where the OS 411 itself does not provide the PAF as an interface between the applications and the route selection manager, the masking unit 413 may provide the PAF. Whether provided by the OS 411 or the masking unit 413, the PAF may be configured to mask an App ID corresponding to one or more applications, thereby to generate a masked App ID. Masking the App ID may include replacing the App ID in the application registry with an anonymized (e.g., by replacing it with the ID of another application and/or by randomizing the App ID) or blank value. Additionally or alternatively, masking the App ID may include requesting application attribute data which includes the App ID from the application registry, replacing the App ID with an anonymized or blank value, thereby to generate a masked application attribute data which includes the masked App ID.

One or more of the OS 411, the I/O module 412, and/or the masking unit 413 may physically reside within the controller 410 and/or may instead reside within the memory 420 and/or may be provided as separate units within the wireless device 400. Moreover, while the OS 411, the I/O module 412, and the masking unit 413 are illustrated as separate units, in practical implementations some or all of the units may be combined and/or share components The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit connection requests via the wireless communication circuitry 430 and receive responses via the wireless communication circuitry 430, the responses indicating whether the connection requests have been accepted or denied. The wireless device 400 may include additional wireless communication circuitry elements, for example to communicate using different RATs.

Figure 5:
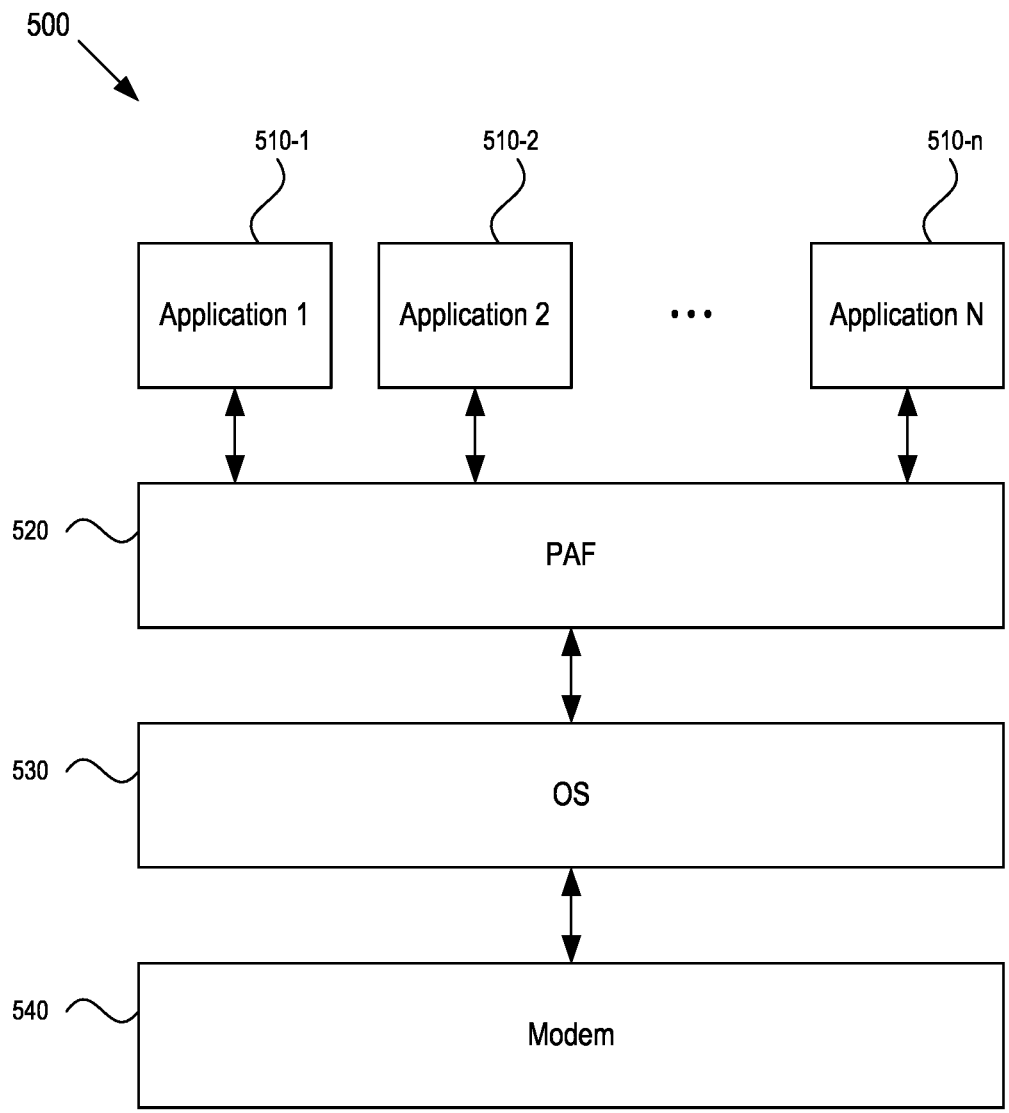
FIG. 5 illustrates an exemplary functional configuration in a wireless device in accordance with various aspects of the present disclosure.

While the above description ascribes certain operations to particular sub-modules or units of the controller 410 (e.g., generating a masked App ID by the masking unit 413), the present disclosure is not so limited. It is sufficient that any component of the wireless device 400 perform the above-described operations and, in particular, provide the PAF. A general hierarchy within the wireless device is illustrated in FIG. 5, as will be described in more detail below.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless device 250. Wireless network protocols can comprise Multimedia Broadcast Multicast Services (MBMS), CDMA, 1xRTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G Advanced, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links connecting the access node 230 to the 5G core 220 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G Advanced, or combinations thereof. The communication links may respectively be a direct link or might include various equipment, intermediate components, systems, and networks. The communication links may comprise many different signals sharing the same link.

The communication network 210, the access node 230, and/or the 5G core 220 may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a User Plane Function (UPF). Control plane NFs can provide one or more NFs based on a request-response or subscribe-notify model. In some implementations, the PCF generates and/or installs URSP rules from the network into the wireless device. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 220. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 220, thereby terminating RAN control plane and UE traffic originating on either the N1 or N2 reference interface. In the 5G core 220, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QOS) handling, etc. When compared with 4G EPC, the functions of the UPF may resemble those of the SGW-U (Serving Gateway User Plane function) and PGW-U (PDN Gateway User Plane function).

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 230 and the communication network 210.

To implement user application usage masking in accordance with the present disclosure, FIG. 5 illustrates a general hierarchy within a wireless device 500. In FIG. 5, the wireless device 500 may correspond to one or more of the wireless devices 140 shown in FIG. 1, the wireless device 250 shown in FIG. 2, and/or the wireless device 400 shown in FIG. 4. The wireless device includes a number of installed applications 510-1 to 510-n, which collectively are referred to as "applications 510." In practice, any number of applications 510 may be installed on the wireless device 500. The applications 510 communicate with a PAF 520, which in turn communicates with an OS 530. The OS 530 may include an application registry which stores attributes related to each of the applications 510, including an App ID for each of the applications 510. The OS 530 is in communication with a modem 540, which may correspond to at least a component of the wireless communication circuitry 430 illustrated in FIG. 4. The modem 540 provides communication between the wireless device 500 and external devices. A URSP manager may be included in the OS 530 and/or the modem 540.

In operation, a user of the wireless device 500 may toggle the PAF 520 on a per-app basis (e.g., initiate a privacy enable request and/or a privacy disable request for a specific application 510), on a multiple-app basis (e.g., initiate a privacy enable request and/or a privacy disable request for a group of applications 510, such as all peer-to-peer messaging applications, all financial applications, and so on), and/or on a global basis (e.g., initiate a privacy enable request and/or a privacy disable request for all applications 510). The URSP manager may compare and match the App ID, whether it is the true App ID or a masked App ID, and/or other application attributes with predetermined URSP rules. If there is a matching rule, the URSP manager initiates a logical network connection accordingly (e.g., by binding the App ID with the corresponding single-network slice selection assistance information (S-NSSAI) and other attributes such as DNN, or by establishing the corresponding PDU). After the match occurs, the application traffic is sent (e.g., via the modem 540) to a network slice determined by the URSP manager. For example, if the PAF 520 has been enabled with regard to a certain application 510, the application traffic may be sent to a generic (e.g., a non-specialized or default) network slice, data network (DN), or other URSP route. If instead the PAF 520 has not been enabled with regard to the application 510, the application traffic may be sent to a specialized network slice, DN, or other URSP route as determined by the URSP manager.

Figure 6:
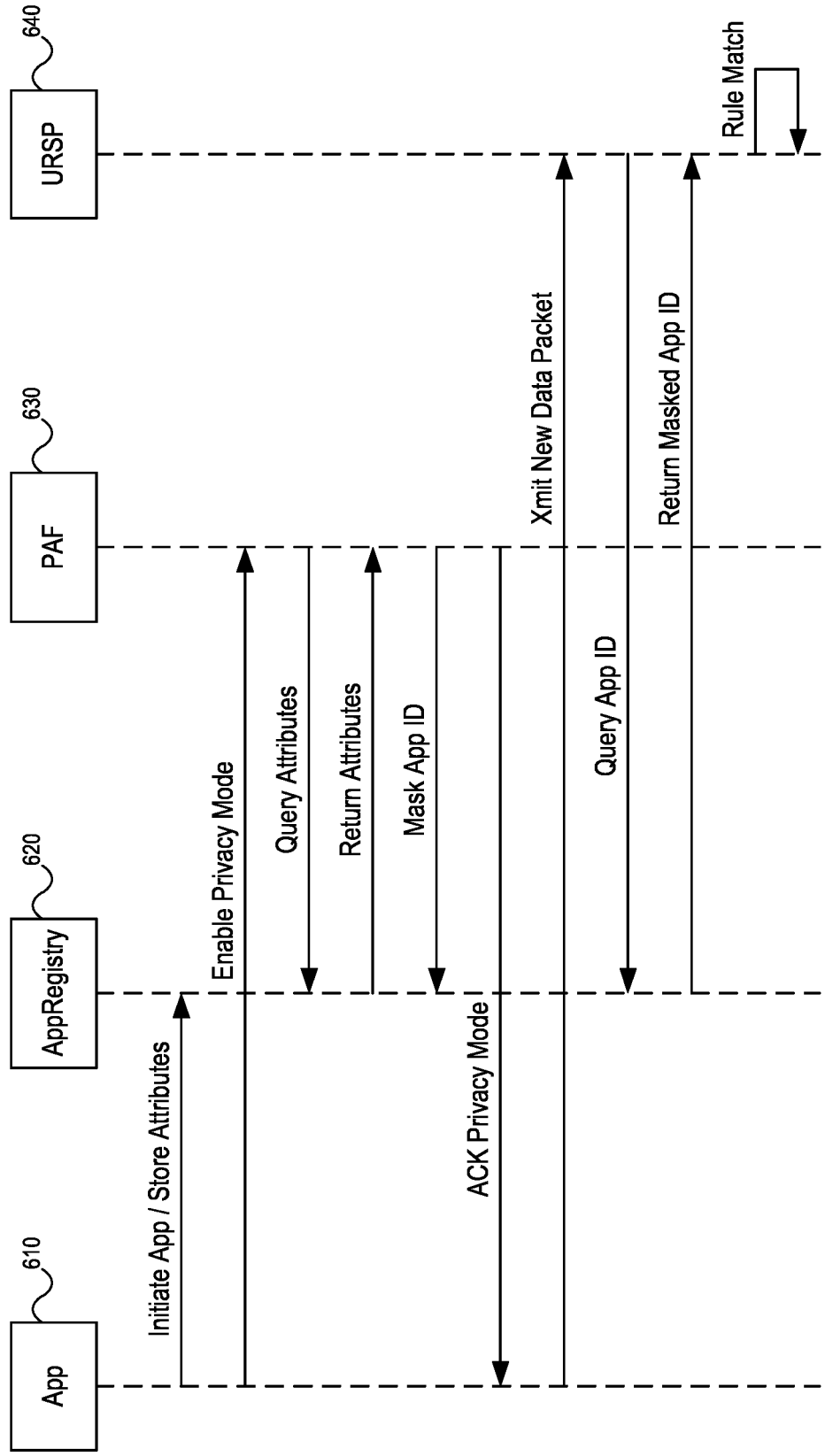
FIGS. 6 and 7 respectively illustrate exemplary general communication flows for masking user application information in accordance with various aspects of the present disclosure.
Figure 7:
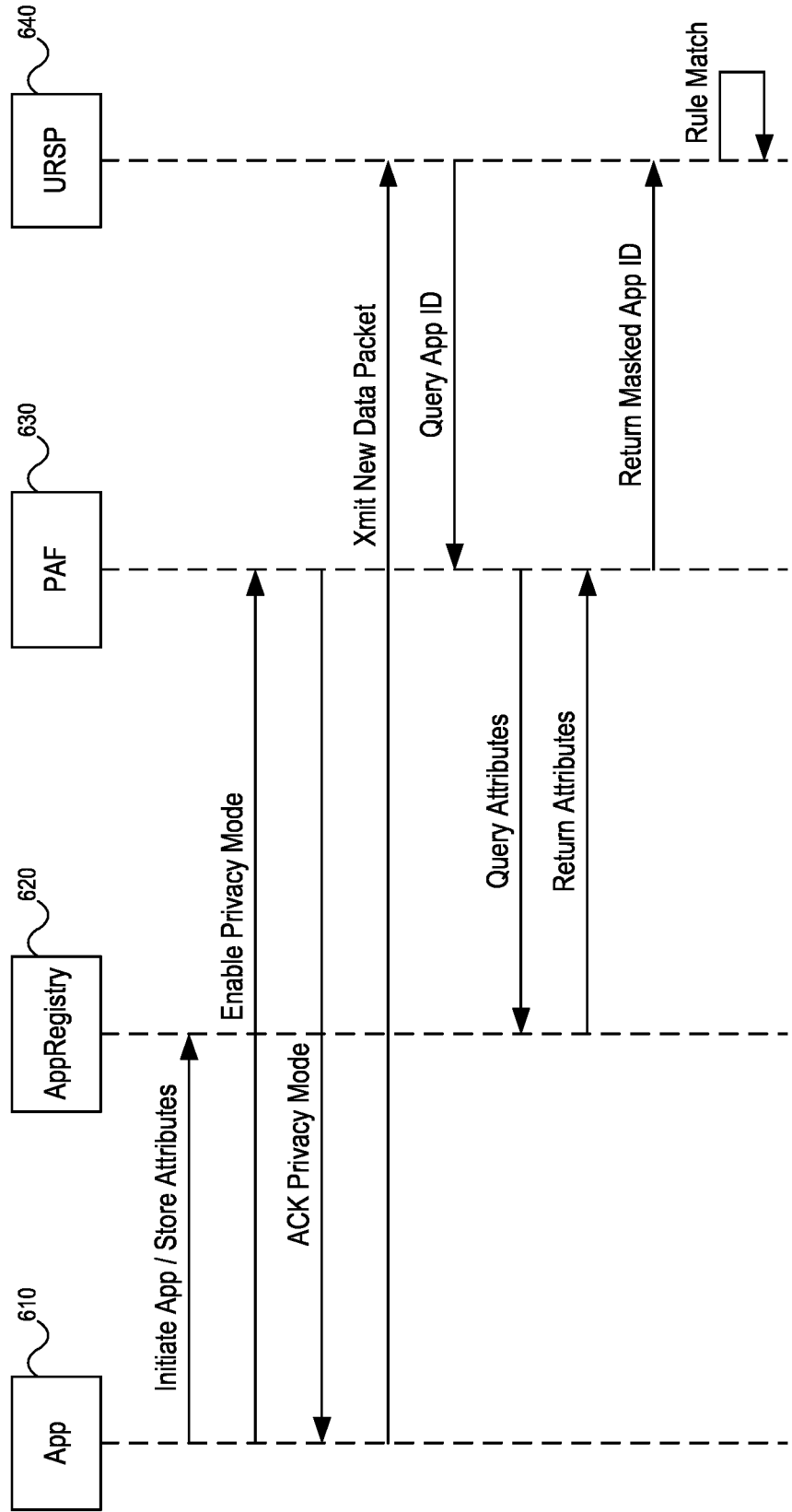

FIGS. 6 and 7 respectively illustrate exemplary communication flows to implement user application usage masking in accordance with the present disclosure. In FIGS. 6 and 7, communications are illustrated between an application 610 (which may correspond to one of the applications 510 illustrated in FIG. 5), an application registry 620 (which may reside in the OS 530 illustrated in FIG. 5), a PAF 630 (which may correspond to the PAF 520 illustrated in FIG. 5), and a URSP manager 640 (which may reside in the OS 530 illustrated in FIG. 5, the modem 540 illustrated in FIG. 5, and/or in a network component such as the PCF described above with regard to FIG. 2).

In the example of FIG. 6, the communication flow begins when the application 610 initiates and stores attributes in the application registry 620. Next, the application 610 enables a privacy mode. This may be accomplished by transmitting a privacy enable request to the PAF 630 (e.g., in response to a user request). The PAF 630 then queries the application registry 620 for application attributes, receives the application attributes from the application registry 620, masks the App ID, and stores the masked App ID in the application registry 620. Thereafter, the PAF 630 transmits an acknowledgement to the application 610. During operation of the application 610, it may transmit a new data packet to the URSP manager 640. In order to determine the appropriate URSP route, the URSP manager 640 may query the application registry 620 for the App ID corresponding to the application 610 (e.g., the App ID which matches the filter attributes of the data packet). Because the PAF 630 previously masked the App ID in the application registry 620, the application registry 620 will then return the masked App ID to the URSP manager 640. Because the App ID has been masked, the URSP manager 640 will then match the data packet to a generic traffic rule, sending the packet over a default connection. As a result, a generic PDU session is established over a generic network slice, which is not application specific.

In the example of FIG. 7, the communication flow begins when the application 610 initiates and stores attributes in the application registry 620. Next, the application 610 enables a privacy mode. This may be accomplished by transmitting a privacy enable request to the PAF 630 (e.g., in response to a user request). The PAF 630 enables privacy with regard to the application 610 and transmits an acknowledgement to the application 610. During operation of the application 610, it may transmit a new data packet to the URSP manager 640. In order to determine the appropriate URSP route, the URSP manager 640 may query the PAF 630 for the App ID corresponding to the application 610 (e.g., the App ID which matches the filter attributes of the data packet). In response to this query, the PAF 630 may query the application registry 620 for application attributes. The application registry 620 returns all application attributes to the PAF 630, which masks the App ID and returns the masked App ID to the URSP manager 640. Because the App ID has been masked, the URSP manager 640 will then match the data packet to a generic traffic rule, sending the packet over a default connection. As a result, a generic PDU session is established over a generic network slice, which is not application specific.

Figure 8:
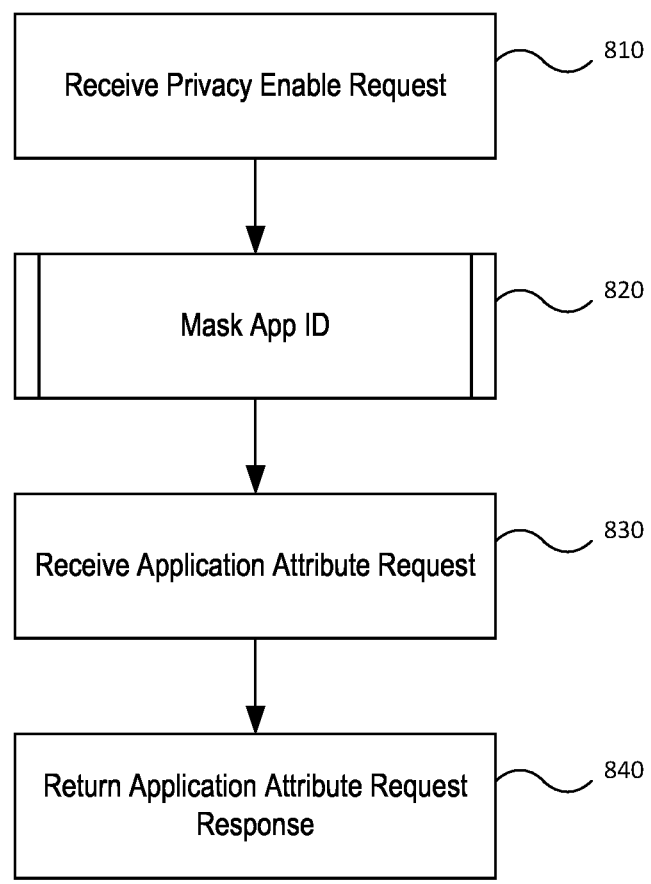
FIGS. 8, 9A, and 9B respectively illustrate exemplary process flows for masking user application information in accordance with various aspects of the present disclosure.

FIG. 8 illustrates an exemplary process flow for managing a communication session (i.e., for masking user application usage). The operations of FIG. 8 will be described as being performed by the wireless device 400 for purposes of explanation. For example, the operations of FIG. 8 may be performed by an application, an application registry, a PAF, or by one or more of these elements in combination. FIG. 8 begins at operation 810 of receiving a privacy enable request. In response to the privacy enable request, at operation 820 an App ID corresponding to the application requesting privacy is masked. This may be accomplished via the suboperations illustrated in FIGS. 9A and/or 9B, which will be described in more detail below. Thus, operations 810 and 820 may establish a privacy mode for a particular application.

Subsequently, an operation 830 may occur of receiving an application attribute request. The application attribute request may be received from a route selection manager (e.g., a URSP manager), and may include a request for an App ID. In response to the privacy enable request of operation 810 and the application attribute request of operation 830, an operation 840 may be performed of returning an application attribute request response to the route selection manager, the application attribute request including the masked App ID. Subsequently, the route selection manager may establish a PDU session for communications associated with the application. For example, the PDU session may be established on a generic network slice due to the masked nature of the App ID.

Figure 9A:

As shown in FIG. 9A, operation 820 of masking the App ID may include an operation 910A of replacing the application identifier in an application registry associated with the wireless communication device with an anonymized value or with a blank value. The anonymized value may be a random value, or may be a value which corresponds to the App ID of a different application (e.g., a generic application such as a clock synchronization application).

Figure 9B:
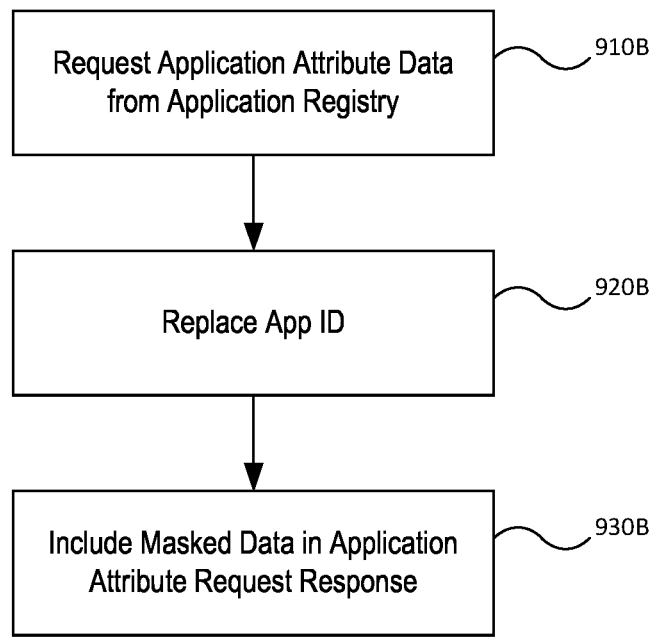

As shown in FIG. 9B, operation 820 of masking the App ID may include an operation 910B of requesting an application attribute data from an application registry associated with the wireless communication device, the application attribute data including the App ID; an operation 920B of replacing the App ID in the application attribute data with an anonymized value or with a blank value, thereby to generate a masked application attribute data which includes a masked App ID; and an operation 930B of including the masked application attribute data in the application attribute request response (e.g., in operation 840). As above, the anonymized value may be a random value, or may be a value which corresponds to the App ID of a different application (e.g., a generic application such as a clock synchronization application).

The privacy mode may be selectively toggled by the user. For example, after generating the privacy enable request of operation 810, a user may later generate a privacy disable request corresponding to the application. This may result in unmasking the App ID corresponding to the application, which may be performed by performing the converse of the operations shown in FIGS. 9A and/or 9B. Both the privacy enable request and the privacy disable request may be initiated in response to a command by the user and/or may be predetermined by a manufacturer of the wireless device (e.g., as a default mode). Moreover, both the privacy enable request and the privacy disable request may be initiated on an application-by-application basis, a group-by-group basis, or a global basis.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing a wireless communication session, the method comprising:
   receiving a privacy enable request from an application associated with a wireless communication device;
   masking an application identifier corresponding to the application, thereby to generate a masked application identifier, the masking including:
   requesting an application attribute data from an application registry associated with the wireless communication device, the application attribute data including the application identifier,
   replacing the application identifier in the application attribute data with an anonymized value or with a blank value, thereby to generate a masked application attribute data, and
   including the masked application attribute data in an application attribute request response;
   receiving an application attribute request from a route selection manager, the application attribute request including a request for the application identifier; and
   in response to the privacy enable request and the application attribute request, returning the application attribute request response to the route selection manager, the application attribute request including the masked application identifier.

2. The method according to claim 1, wherein the masking the application identifier further includes replacing the application identifier in the application registry associated with the wireless communication device with an anonymized value or with a blank value.

3. The method according to claim 1, further comprising:
   in response to the masked application identifier, establishing a protocol data unit (PDU) session for communications by the wireless communication device and associated with the application.

4. The method according to claim 3, wherein the PDU session is established on a generic network slice.

5. The method according to claim 1, further comprising:
   receiving a privacy disable request from the application; and
   unmasking the application identifier corresponding to the application.

6. The method according to claim 5, wherein the privacy disable request is initiated in a response to a command by a user of the wireless communication device.

7. The method according to claim 1, wherein the privacy enable request is initiated in a response to a command by a user of the wireless communication device.

8. A telecommunications system comprising:
   an access node; and
   a wireless communication device configured to communicate with a network via the access node, the wireless communication device storing an application, an application registry, and a privacy manager,
   wherein the privacy manager is configured to:
   receive a privacy enable request corresponding to the application, and
   mask an application identifier corresponding to the application, thereby to generate a masked application identifier, by requesting an application attribute data from the application registry, the application attribute data including the application identifier, replacing the application identifier in the application attribute data with an anonymized value or with a blank value, thereby to generate a masked application attribute data, and including the masked application attribute data in an application attribute request response,
   wherein the wireless communication device is configured to:
   receive an application attribute request from a route selection manager, the application attribute request including a request for the application identifier, and
   in response to the privacy enable request and the application attribute request, return the application attribute request response to the route selection manager, the application attribute request including the masked application identifier.

9. The system according to claim 8, wherein the application registry is configured to receive the application attribute request and to return the application attribute request response to the route selection manager.

10. The system according to claim 9, wherein the privacy manager is further configured to mask the application identifier by replacing the application identifier in the application registry with an anonymized value or with a blank value.

11. The system according to claim 8, wherein the privacy manager is configured to receive the application attribute request and to return the application attribute request response to the route selection manager.

12. The system according to claim 8, wherein the route selection manager is disposed in the wireless communication device.

13. The system according to claim 8, wherein the route selection manager is disposed in the access node or in the network.

14. A wireless communication device, comprising:
a memory storing an application;
wireless communication circuitry configured to communicate with an access node; and
a processor configured to perform operations comprising:
 receiving a privacy enable request from an application associated with a wireless communication device,
 masking an application identifier corresponding to the application, thereby to generate a masked application identifier, the masking including requesting an application attribute data from an application registry associated with the wireless communication device, the application attribute data including the application identifier, replacing the application identifier in the application attribute data with an anonymized value or with a blank value, thereby to generate a masked application attribute data, and including the masked application attribute data in the application attribute request response,
 receiving an application attribute request from a route selection manager, the application attribute request including a request for the application identifier, and
 in response to the privacy enable request and the application attribute request, returning the application attribute request response to the route selection manager, the application attribute request including the masked application identifier.

15. The device according to claim 14, wherein the masking the application identifier further includes replacing the application identifier in the application registry associated with the wireless communication device with an anonymized value or with a blank value.

16. The device according to claim 14, wherein the privacy enable request is configured to be selectively enabled and disabled by a user of the wireless communication device.

17. The device according to claim 14, wherein the application is a first application among a plurality of applications, and the privacy enable request is specific to the first application.

* * * * *